United States Patent
Blincoe

(10) Patent No.: US 8,109,394 B1
(45) Date of Patent: Feb. 7, 2012

(54) CONSTRUCTION TEMPLATE

(76) Inventor: Thomas Blincoe, Bardstown, KY (US)

( * ) Notice: Subject to any disclaimer, the term of this patent is extended or adjusted under 35 U.S.C. 154(b) by 616 days.

(21) Appl. No.: 12/218,684

(22) Filed: Jul. 17, 2008

(51) Int. Cl.
*A47G 19/08* (2006.01)

(52) U.S. Cl. .................................................. 211/41.15

(58) Field of Classification Search ............. 211/41.15, 211/41.14; 206/451, 454, 448, 449
See application file for complete search history.

(56) References Cited

U.S. PATENT DOCUMENTS

| | | | | |
|---|---|---|---|---|
| 1,914,241 A * | 6/1933 | Campbell | .................. | 211/41.15 |
| 2,566,179 A * | 8/1951 | Evans, Jr. et al. | ............ | 217/43 R |
| 3,709,358 A * | 1/1973 | Andrews et al. | ............... | 206/451 |
| 3,809,234 A * | 5/1974 | Kurick | ........................... | 206/448 |
| 3,878,942 A * | 4/1975 | Hansen et al. | ................ | 206/454 |
| 4,014,435 A * | 3/1977 | Rowley et al. | ................ | 206/386 |
| 4,147,112 A * | 4/1979 | Green et al. | ..................... | 410/94 |
| 4,278,171 A * | 7/1981 | Millhoan | ........................ | 206/451 |
| 4,921,101 A * | 5/1990 | Gatt | ............................... | 206/451 |
| 5,145,073 A * | 9/1992 | Kitagawa et al. | .......... | 211/41.14 |
| 5,148,924 A * | 9/1992 | Mason et al. | ............... | 211/41.14 |
| 5,582,495 A * | 12/1996 | Schroeder | ....................... | 410/32 |
| 5,584,399 A * | 12/1996 | King | .......................... | 211/41.15 |
| 5,641,076 A * | 6/1997 | Englund | ..................... | 211/41.14 |
| 5,755,339 A * | 5/1998 | Belanger et al. | ............ | 211/41.14 |
| 5,909,808 A * | 6/1999 | Bartholomew | ............... | 206/451 |
| 5,924,577 A * | 7/1999 | Gessert | ........................ | 211/41.1 |
| 6,910,591 B2 * | 6/2005 | Knoll et al. | ................. | 211/41.14 |
| 7,090,105 B2 * | 8/2006 | Adamczewski et al. | ...... | 224/543 |
| 7,117,997 B2 * | 10/2006 | Clover | ........................ | 211/41.15 |
| 7,143,901 B1 * | 12/2006 | Groves | ........................ | 211/41.14 |
| 7,150,361 B2 * | 12/2006 | Calleja | ......................... | 211/49.1 |
| 7,210,579 B2 * | 5/2007 | Fujioka et al. | ................ | 206/451 |
| 7,264,126 B1 * | 9/2007 | Bergeron | ..................... | 211/41.14 |
| 7,458,476 B2 * | 12/2008 | Peoples et al. | ................ | 211/134 |
| 7,527,274 B2 * | 5/2009 | Strauss et al. | ............ | 280/33.991 |
| 2005/0279720 A1 * | 12/2005 | Blincoe | ....................... | 211/41.15 |
| 2007/0221592 A1 * | 9/2007 | Strauss et al. | .............. | 211/41.15 |

* cited by examiner

*Primary Examiner* — Sarah Purol
(74) *Attorney, Agent, or Firm* — Charles Lee Thomason

(57) ABSTRACT

A construction template mounted on a mobile platform. The template is useful in the assembly of racks made for storing barrels, typically barrels of distilled spirits in a warehouse. Beams that will be joined to form a rack are placed alongside upright positioning elements of the construction template. Beams are placed horizontally held by tabs on the construction template. Then the upright and horizontal beams are joined to form a rack assembly that is lifted and moved off the platform.

8 Claims, 2 Drawing Sheets

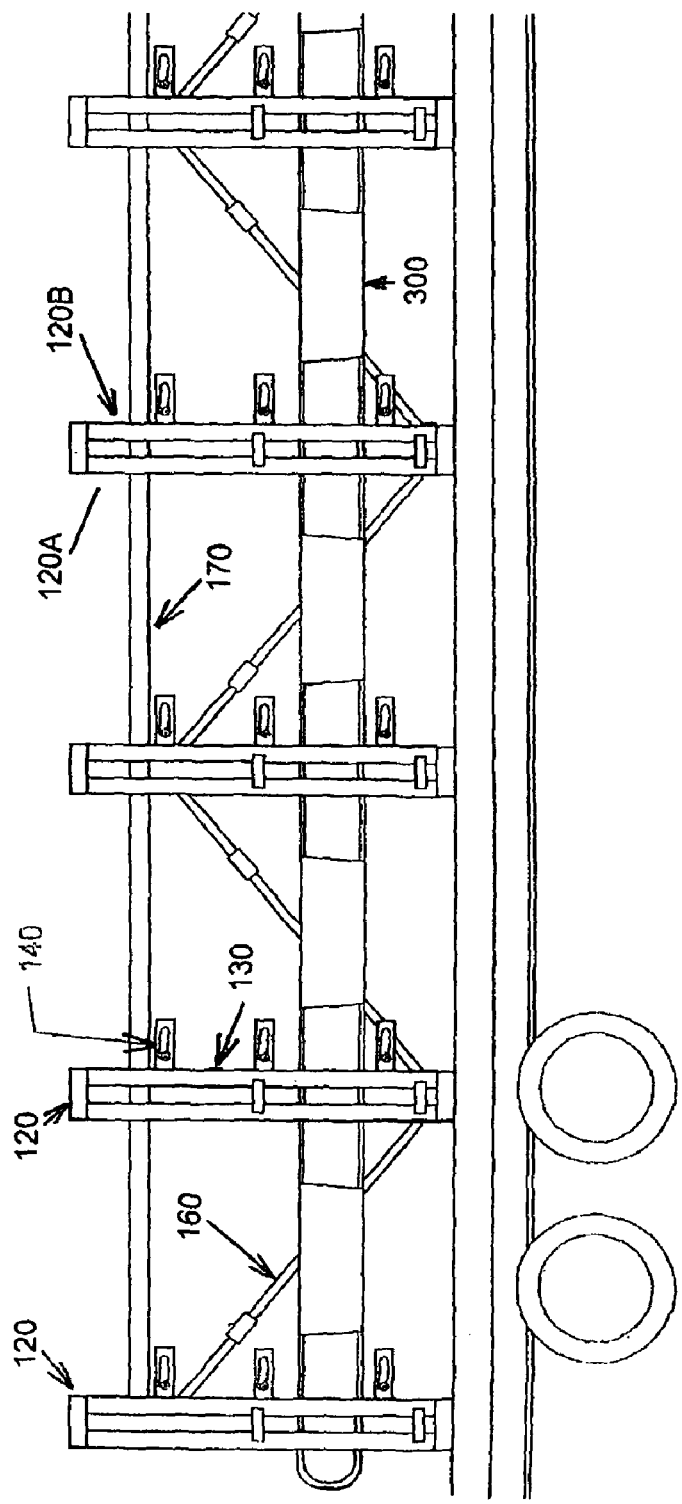

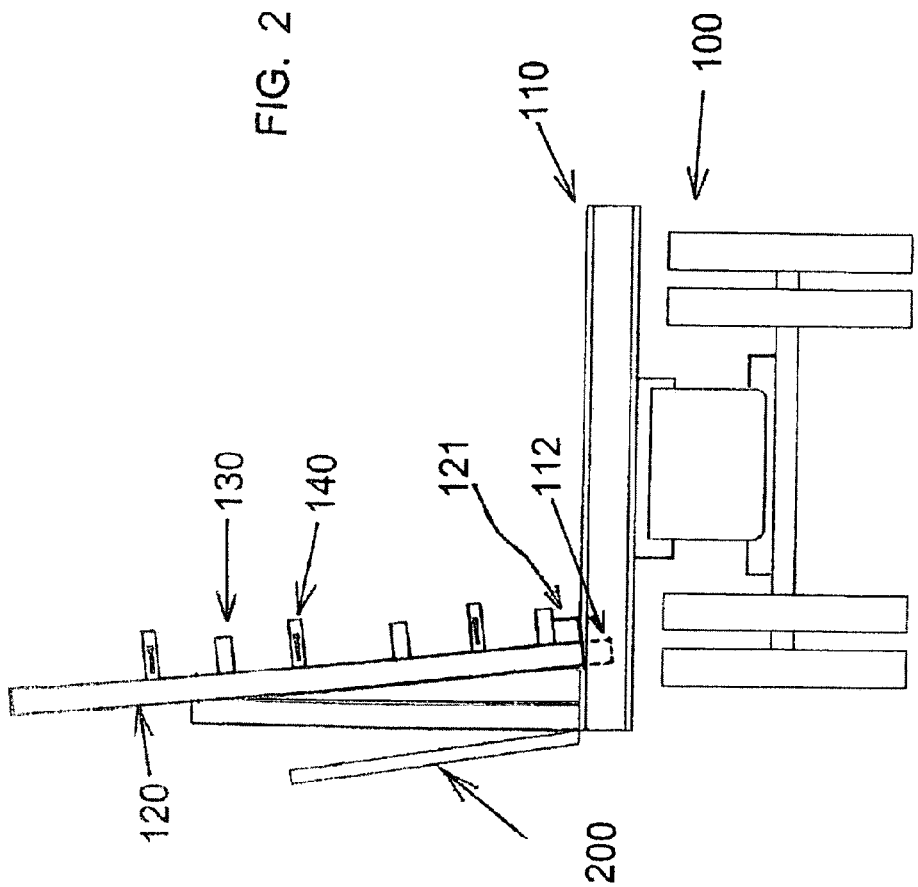

CONSTRUCTION TEMPLATE

PRIORITY CLAIM

This application claims priority to U.S. Utility patent application Ser. No. 11/155,951, filed Jun. 15, 2005, and U.S. Provisional Application No. 60/580,428 filed Jun. 17, 2004.

BACKGROUND OF THE INVENTION

1. Field of the Invention

The present invention relates generally to construction templates. More specifically, the present invention relates to a mobile construction template for creating large segments of structural lattice framework that is used in warehouses that store barrels.

2. Background

Support frames have long been used for supporting barrels of distilled spirits that are aged at wineries and distilleries. The interconnected lattice-work creates support racks on which rows of barrels are placed. This lattice-work has to be exceptionally strong as often several stories of racks are contained in each warehouse for housing thousands of barrels, each barrel weighing hundreds of pounds. The barrel racks must enable the barrels to be stored in an organized fashion, due to the need periodic relocation of each barrel during the ageing period, and to provide ultimately for removal of the barrels from the warehouse. It is well-known in the art that a certain amount of airflow is necessary between the barrels to promote proper maturation of the spirits and that uniformity of the racks will aid in maintenance of the desired airflow. Also, the supporting framework of these barrel racks is constructed using a series of almost identical segments of post and beam frames, that run parallel and that are stacked one frame upon another inside a warehouse.

A common method of constructing lattice-work is through the use of skilled carpenters inside the barrel warehouse. Each piece of the lumber used to make barrel support structures would be cut and assembled piece by piece inside the warehouse. To accelerate the construction, a need exists for a mobile construction template.

The prior art methods for hand-assembling the lattice-work did result in the racks being constructed in proper form, but the costs were high due to the wasted materials, hours of labor, and the need for carpenters with the requisite skills in the method. Wasted materials result from the individual construction of each element of the lattice-work, from sawing off the vertical support members, to fit and provide attachment to the horizontal barrel support members. Hours of hand labor were spent to orient and manually assemble the components of the lattice-work. Furthermore, skilled construction laborers are required since proper sizing and fit of each rack is necessary to achieve a level rack with the desired rack spacing, which allows for the periodic rotation and relocation of the barrels. In addition, when expansion of an existing warehouse is desired, the skilled labor force would have to work within the temperature and humidity conditions within the warehouse.

The present invention provides a construction template system designed to create full lattice segments on a mobile unit, which enables the construction of support frame and their placement for use in barrel warehouses, thereby reducing the production inefficiencies experienced through manual construction, and assembly inside a barrel warehouse.

BRIEF SUMMARY OF THE INVENTION

The present invention is directed toward a system for the efficient production of lattice-work for storing barrels in a barrel warehouse. The construction template of the present invention comprises a combination different components used together in an effective manner.

The lattice construction system is based off of a mobile trailer allowing for relocation of the system near the work site, such as where a warehouse is being built or expanded. On the main bed are a multitude of near vertical members extending upward and along the length of the main bed, spaced parallel and equidistant. Each vertical member has a series of tabs extending near horizontally, which function in both stabilizing the vertical beams of the lattice segment and also in correctly positioning the barrel support beams for proper attachment of the vertical beams to the horizontal barrel support beams.

The described invention alleviates many of the problems associated with construction of lattice-work for supporting barrels full of spirits. One of the largest advantages of the lattice construction system is the correct orientation of each beam; the vertical members and extending tabs mandate proper height, spread, and angle of the lattice.

This template system minimizes common construction errors by individual laborers working on a barrel warehouse. Additionally, in the case of a barrel warehouse expansion, less disruption is caused to the preexisting storage areas. Finally, the lattice construction system is mobile; the system can be also be used directly outside the barrel warehouse or in a remote location where construction may be more practical.

BRIEF DESCRIPTION OF THE DRAWINGS

The teachings of the present invention can be readily understood by considering the following detailed description in conjunction with the accompanying drawings, in which:

FIG. 1 is a detailed front view of one embodiment of a lattice construction system;

FIG. 2 is a side view of one embodiment of a lattice construction system.

DETAILED DESCRIPTION OF THE PREFERRED EMBODIMENTS

While the present invention will be described more fully hereinafter with reference to the accompanying drawings in which particular embodiments and methods are shown, it is to be understood from the outset that persons of ordinary skill in the art may modify the mobile construction template herein described and achieve the functions and results of this invention. Accordingly, the description is to be understood as illustrative and exemplary of workable embodiments within the broad scope of the invention, and not as limiting its scope. In the following descriptions, like numbers refer to similar features or like elements throughout.

Referring now to FIG. 1, a front total view of an embodiment of a lattice construction system is shown. Affixed on a typical truck-drawn trailer 100, or equivalent mobile unit, is the main horizontal bed 110. The horizontal bed 110 provides structural integrity to the lattice construction system, and also offers an ideal walkway for laborers using the system.

A plurality of vertical beam positioning members commonly designated at 120 are mounted onto the main horizontal bed 110 and extend upward. The vertical support beams of the lattice structure are positioned in contact with each vertical beam positioning member 120. In the preferred embodiment, these vertical beam positioning members are not mounted vertically on the bed, but rather are in a tilted position. The tilting of these members 120 allows the workpiece beam to be laid against the positioning member so that the beam rests back against the member 120 and remains in that location while the further steps and parts are being worked with.

The vertical beams may be cut to the desired length while in place against the positioning member, or precut to a predetermined length before being placed against the vertical positioning member. In that manner, the positioning member serves as a template for the vertical beam to be cut to the predetermined length, and as a template to locate the point at which the vertical beams will be joined to the horizontal beams to form a segment of the barrel support lattice.

Extending, perpendicularly outward, from the vertical beam positioning members 120 are position maintenance tabs 130. The purpose of these tabs is to provide a support or rest for the horizontal beam members that will be joined to the vertical beams. The position maintenance tabs 130 maintain the position of the vertical support beams that form the lattice structure, and the tabs minimize lateral movement.

In one preferred embodiment, the tabs are connected along the side of the vertical positioning member, and in other embodiments, the tabs are adjacent to those members. The position maintenance tabs 130 are positioned in an identical vertical arrangement on each respective vertical beam positioning member 120 so that the lowest position maintenance tab 130 of each vertical beam positioning member 120 is the exact distance above the main horizontal bed 110 as are each of the other lowest position maintenance tabs 130 on the other vertical beam positioning members 120. So too, the distance between each of the vertical beam positioning members 120 is the same, across the bed.

In the preferred embodiment, each vertical positioning member has a pair of maintenance tabs, starting with a first pair near the lower end of the member, and the desired number of pairs placed above that first pair. In that manner, the tabs are located at an equal, predetermined distance on the vertical beam positioning members 120. The horizontal beams may be cut to the desired length while in place on the maintenance tabs, or precut to a predetermined length before being placed on the tabs. These elements provide a template for joining the horizontal beam resting on the tabs to the vertical beam on the positioning member.

Post clamps 140 secure each vertical support beam and square the beam in tight contact with each vertical beam positioning member. The claims may be adjustable so that they can be used to hold the horizontal beams in place as well. The post clamps may be clamps that are manually tighten, or in other embodiments, the securing hardware may secure using friction against the beam or may gouge the wooden beam. In one preferred embodiment, the clamp mechanism slides along the vertical positioning member such that it is moved up or down to contact the beam or beam near the point where the vertical beam and horizontal beam are to be joined.

A further utilitarian feature of the mobile unit provide electrical power along the bed of the platform, with the preferred embodiment having an electrical conduit 160 that runs behind the vertical beam positioning members 130 in a zigzag fashion. Finally, stability beams 170 run horizontally, attached to the rear side of the vertical support position members 120 providing strength and stability to the lattice construction system. By this method of joining upright members to cross beams, to form a matrix of beams joined at its interstices with hardware typical of such construction, results in large frames to support barrels being made more efficiently.

FIG. 2. illustrates a side view of the same embodiment of the lattice construction system. From this angle, the folddown walkway 200 is visible, providing an area behind the vertical beam positioning members 120 for laborers to traverse.

Further disclosed is an embodiment of the lattice construction system with containment bins 300. These bins can be used to store tools, attachment materials, and other various supplies for operation of the lattice construction system. The electrical connections 160 provide easy accessibility for any tools that require electrical power.

The mobile apparatus is taken to the desired location, and the components of the construction template are erected on the bed of the trailer, which has prepositioning footings in the bed or slots 112 therethrough, which accept the lower end of the vertical positioning member. With this embodiment, vertical support beams of the lattice structure are placed in contact with each respective vertical beam positioning member 120, and in between the sets of position maintenance tabs 130, which in the preferred embodiment extend from each vertical beam positioning member 120.

Also, in one preferred embodiment, each vertical beam positioning member 120 is comprised of two, parallel metal struts 120A and 120B, and the distance between those struts is adequate for the vertical beam to be placed between them. In this embodiment, the struts act as a template to align the vertical beam in perpendicular relation to the barrel support beams to which the vertical beams are joined to form a segment of the support frame for the barrels. In the working arrangement, the lower end of the vertical beam is placed in a footing 121 at the base of the vertical beam positioning member 120, on the trailer-mounted bed, and laid back in alignment with the struts on that member. As the work progresses, vertical beams are placed against each of the vertical beam positioning members. The barrel support beams are positioned horizontally, resting up the position maintenance tabs 130. In this manner, the barrel support beams extend across the construction template, at an uniform height, and in contact with each vertical support beam. Once the beams are in place, the post clamps are secured over, to, or around the beams, which minimizes movement of the beams as they are joined. The barrel support beams and vertical support beams can then be fixed together at their various intersections by either brackets, long nails or other suitable joining hardware, or suitable construction adhesives. Thus, the lattice construction system created a segment of a lattice-work with beams meeting perfectly at perpendicular angles with each beam in a position and with spacing predetermined by the template of the lattice construction system.

For the installation of the lattice segments in the barrel warehouse, the completed support segments are either carried off the trailer 100 to the barrel warehouse site, or when assembled at the construction site, the lattice segments are lifted directly off the trailer by crane slings and lowered into place in the proper orientation within the warehouse being built or expanded. In a typical circumstance, the completed frame is lifted from the trailer-mounted template, and placed on footings in the warehouse, then another frame is lifted onto the frame on the footing, and so forth, until the desired number of levels for barrel storage is reached.

The entire lattice construction system is relatively simple but yet highly efficient, requiring few laborers and little maintenance, providing a number of advantages over the manual construction of barrel racks. The lattice construction system can be operated by semi-skilled workers since the system orients the beams at the proper angles and height. The mobile unit provides a work area on the bed 110, and additionally, the preferred embodiment includes a walkway 200 that extends off the bed. This walkway enables workers to work from both sides of the template, which is useful to placing and joining the beams. In working arrangement, workers on one side of the bed will pass the beams to workers on the bed, who will place those on the template, and then workers on the bed and the walkway will affix the joining hardware. The support segments can be constructed outside of the warehouse and subsequently installed, allowing for much less construction time inside the warehouse. All that is necessary is the proper securing of the segment in the warehouse.

The mobile lattice construction system can be utilized away from the warehouses in hilly or confined places, at a better construction location. With those barrel warehouses located on hilltops, the lattice construction system eliminates the need to construct barrel racks in non-ideal locations.

One preferred embodiment of the invention is a construction template comprising: a movable platform, a plurality of positioning members mounted generally upright on said platform, each said member being mounted parallel to, and equidistant from the adjacent members, each said positioning member having an upper and a lower end, a plurality of position maintenance tabs on each said positioning member, said tabs extending outwardly from said member, with a first tab near the lower end of said member, then a second tab above said first tab and equidistant therefrom, a plurality of beam clamps attached to each said positioning member, to releasably secure a beam in horizontal relation to said upright positioning members.

In a variation of the construction template based on that preferred embodiment, the movable platform comprises a flat bed trailer for being moved by a motorized vehicle.

Further, in another variation of the construction template based on that preferred embodiment, each positioning member is mounted approximately ten degrees off of vertically upright on said platform.

In another variation of the construction template based on that preferred embodiment, each positioning member comprises two parallel struts set apart at a distance predetermined to accept a beam.

With another variation of the construction template based on that preferred embodiment, each positioning member comprises two parallel struts set apart at a distance predetermined to accept a beam, and at predetermined points, a pair of said maintenance position tabs are attached to the pair of struts.

In another variation of the construction template based on that preferred embodiment, each beam clamp comprises an extendable beam gripper and adjustable securing hardware for the gripper.

Another preferred embodiment of the invention is a construction template comprising: a movable platform, a plurality of lateral positioning members or means mounted generally upright on said platform, each said member being mounted parallel to, and equidistant laterally from the adjacent members, each said positioning member having an upper and a lower end, a plurality of position maintenance tabs on each said positioning member, said tabs extending outwardly from said member, with a first tab near the lower end of said member, then a second tab above said first tab and equidistant therefrom, a plurality of beam clamps attached to each said positioning member, to support a beam releasably in horizontal relation to said upright positioning members.

In a variation of the construction template based on that preferred embodiment, each lateral positioning member is mounted at a predetermined angle off of vertically upright on the platform.

Further, in another variation of the construction template based on that preferred embodiment, each lateral positioning member comprises two parallel struts set apart at a distance predetermined to accept a beam, and the distance is predetermined by the length of the beam.

In another variation of the construction template based on that preferred embodiment, each lateral positioning member comprises two parallel struts set apart at a distance predetermined to accept a beam, and at predetermined points, a pair of the position maintenance tabs are attached to the pair of struts.

With another variation of the construction template based on that preferred embodiment, each beam clamp comprises an extendable beam gripper and adjustable support hardware.

The preferred embodiments are useful when the structural elements are utilized as a construction template, and the steps preferred provide a method of assembling barrel support segments using a construction template, comprising: positioning a vertical beam against a vertical beam positioning member of said construction template, placing a horizontal beam upon position maintenance tabs of said construction template, clamping said beams securely for joining, joining said horizontal beam to said vertical beam at a predetermined point, lifting said joined beams from said construction template. Persons of ordinary skill would understand not to practice these steps by another and materially different apparatus or by hand, and would not use the claimed apparatus to practice another and materially different method.

A variation of the present invention is a preferred embodiment of a construction template comprising: a movable platform, a plurality of lateral positioning members mounted generally upright on said platform, each said member being mounted parallel to adjacent members to mandate lateral positions and spread between a plurality of beams, each said positioning member having an upper and a lower end, a plurality of position maintenance tabs on each said positioning member, said tabs extending outwardly from said member, with a first tab near the lower end of said member, then a second tab above said first tab and equidistant therefrom, a plurality of beam clamps attached to each said positioning member, to support a beam releasably in horizontal relation to said lateral positioning members.

Having therefore described my invention, what is claimed is:

1. A construction template comprising: a movable platform, a plurality of lateral positioning members mounted generally upright on said movable platform, each said lateral positioning member being mounted parallel to adjacent lateral positioning members to provide lateral positioning between beams placed generally upright alongside said lateral positioning members of said construction template, each said lateral positioning member having an upper and a lower end, a plurality of position maintenance tabs, said position maintenance tabs extending outwardly from said member, with a first tab near the lower end of each said lateral positioning member, then a second said position maintenance tab above said first position maintenance tab and equidistant therefrom, a plurality of beam clamps attached to each said lateral positioning member to releasably secure a beam placed in horizontal relation to one of said plurality of lateral positioning members of said construction template.

2. The construction template of claim 1, wherein said movable platform comprises a flat bed trailer for being moved by a motorized vehicle.

3. The construction template of claim 1, wherein each said lateral positioning member is mounted approximately ten degrees off of vertically upright on said platform.

4. The construction template of claim 1, wherein each said lateral positioning member comprises two parallel struts set apart at a distance predetermined to accept a beam.

5. The construction template of claim 1, wherein each said lateral positioning member comprises two parallel struts set apart at a distance predetermined to accept a beam, and at predetermined points, and a pair of said maintenance position tabs attached to said pair of struts.

6. The construction template of claim 1, wherein each said beam clamp comprises an extendable beam gripper and adjustable securing hardware for said extendable beam gripper.

7. A construction template for beams placed alongside said construction template for said beam to be joined, comprising: a movable platform, a plurality of means, mounted generally upright on said movable platform, for positioning generally upright beams laterally in relation to other generally upright beams, each said means for positioning being mounted in parallel relation and equidistant from adjacent means for providing lateral positioning, each said means for positioning having an upper and a lower end, a plurality of position maintenance tabs on each said means for positioning, said position maintenance tabs extending outwardly from said means for positioning, with a first position maintenance tab near the lower end of said means for positioning, and a second position maintenance tab above said first position maintenance tab and equidistant therefrom, a plurality of beam clamps attached to each said means for positioning, said position maintenance tabs for releasably securing a beam placed alongside said construction template in horizontal relation to said means for positioning.

8. A construction template of claim 7, wherein to join beams placed alongside said construction template, a method comprising, positioning vertical beams alongside said construction template, specifically alongside a means, mounted generally upright on said movable platform, for positioning vertical beam positioning member of said construction template, placing a horizontal beam upon said position maintenance tabs of said construction template, clamping each horizontal beams securely for joining, joining each horizontal beam to a vertical beam at a predetermined point, lifting said joined horizontal and vertical beams from alongside said construction template.

* * * * *